(12) United States Patent
Michaylov et al.

(10) Patent No.: US 7,865,684 B2
(45) Date of Patent: Jan. 4, 2011

(54) MANAGING MESSAGE QUEUES

(75) Inventors: Spiro Michaylov, Arlington, MA (US); Sanjeev Banerji, Cambridge, MA (US); Craig W. Stanfill, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 33 days.

(21) Appl. No.: 11/169,074

(22) Filed: Jun. 27, 2005

(65) Prior Publication Data

US 2006/0294333 A1     Dec. 28, 2006

(51) Int. Cl.
*G06F 13/00* (2006.01)
*G06F 13/28* (2006.01)

(52) U.S. Cl. .................. 711/168; 711/151; 711/158; 711/162; 711/167; 711/E12.044

(58) Field of Classification Search ........................ None
See application file for complete search history.

(56) References Cited

U.S. PATENT DOCUMENTS

| | | | |
|---|---|---|---|
| 5,371,850 | A | 12/1994 | Belsan et al. |
| 5,386,554 | A | 1/1995 | Nozaki |
| 5,455,944 | A | 10/1995 | Haderle et al. |
| 5,504,899 | A | 4/1996 | Raz |
| 5,530,848 | A | 6/1996 | Gilbert et al. |
| 5,586,312 | A | 12/1996 | Johnson et al. |
| 5,613,060 | A | 3/1997 | Britton et al. |
| 5,857,204 | A | 1/1999 | Lordi et al. |
| 5,887,168 | A | 3/1999 | Bahls et al. |
| 5,906,658 | A | 5/1999 | Raz |
| 6,173,373 | B1 | 1/2001 | Bonola |
| 6,557,056 | B1 | 4/2003 | Lanteigne et al. |
| 6,601,089 | B1 | 7/2003 | Sistare et al. |
| 6,694,388 | B1 | 2/2004 | Schzukin et al. |
| 6,862,595 | B1 | 3/2005 | Elko et al. |
| 6,898,650 | B1 | 5/2005 | Gao et al. |
| 7,068,604 | B2 * | 6/2006 | Chen et al. .................. 370/235 |
| 2003/0041115 | A1 | 2/2003 | Chen et al. |
| 2004/0006633 | A1 | 1/2004 | Chandra et al. |
| 2004/0008678 | A1 | 1/2004 | Matthews et al. |
| 2004/0024794 | A1 | 2/2004 | Jain et al. |
| 2005/0060374 | A1 | 3/2005 | Phillips |

(Continued)

FOREIGN PATENT DOCUMENTS

WO     WO 03/071435     8/2003

OTHER PUBLICATIONS

Apple Computer Inc, "About Queues", Jul. 6, 1996, http://developer.apple.com/documentation/Mac/OSUtilities/OSUtilities-148.html.*

(Continued)

*Primary Examiner*—Hetul Patel
*Assistant Examiner*—Michael Alsip
(74) *Attorney, Agent, or Firm*—Fish & Richardson P.C.

(57) ABSTRACT

A method, and corresponding system and software, is described for writing data to a plurality of queues, each portion of the data being written to a corresponding one of the queues. The method includes, without requiring concurrent locking of more than one queue, determining if a space is available in each queue for writing a corresponding portion of the data, and if available, reserving the spaces in the queues. The method includes writing each portion of the data to a corresponding one of the queues.

27 Claims, 17 Drawing Sheets

OTHER PUBLICATIONS

Kroeger, R. et al., "The Relax Transactional Object Management System", *Security and Persistence, Springer-Verlag*, 339-350, 1990.

European Search Report in EP Application No. EP 06773738, dated Nov. 5, 2009, 16 pages.

* cited by examiner

MANAGING MESSAGE QUEUES

BACKGROUND

The invention relates to managing message queues.

Message queues can be used to provide an asynchronous communication protocol for access entities (e.g., servers, operating systems, software modules, etc.) to exchange messages. Messages placed onto a message queue are stored in a queue data structure until a recipient (e.g., a subscriber to the message queue) retrieves them.

A message queue system may provide "durability" to ensure that messages do not get lost in the event of a system failure (or that any lost messages can be recovered). One way to achieve durability is to synchronize messages stored in volatile memory with a nonvolatile memory, for example, after a given number of incoming messages or bytes of data are received.

SUMMARY

In a general aspect, the invention features a method, and corresponding software and system, for writing data to a plurality of queues, each portion of the data being written to a corresponding one of the queues. The method includes, without requiring concurrent locking of more than one queue, determining if a space is available in each queue for writing a corresponding portion of the data, and if available, reserving the spaces in the queues. The method includes writing each portion of the data to a corresponding one of the queues.

This aspect can include one or more of the following features.

Writing each portion of the data to a corresponding one of the queues occurs after reserving all of the spaces in the queues.

The method further includes, after writing a portion of the data in the corresponding queue, releasing the reservation of the space for the portion of the data written in that queue.

Determining if the space is available in each queue and if available reserving the spaces includes, for each of multiple of the queues: locking the queue; determining if the space is available in the queue; if available reserving the space; and unlocking the queue.

Each portion of the data written to a corresponding one of the queues includes a record.

The method further includes writing a journal record before writing the records to any of the queues.

The method further includes synchronizing each of the queues to non-volatile memory before writing the journal record.

The method further includes, before writing data other than one of the records to a first of the queues, if a space has been reserved in the first queue, locking the first queue while determining whether additional space is available in the first queue for the other data before writing the other data to the first queue.

The method further includes, before writing data other than one of the records to a first of the queues, if a space has not yet been reserved in the first queue, write the data to the first queue without necessarily requiring locking of the first queue.

Determining if the space is available in each queue for writing a corresponding portion of the data includes ensuring that enough space in each queue is available for writing a commit record for any outstanding transactions with the queue.

The method further includes aborting the writing of the corresponding commit records to each of the plurality of queues after determining that enough space would not be reserved in at least one of the queues for writing a commit record for any outstanding transactions with the queue.

Reserving the spaces in the queues includes incrementing a corresponding counter for each queue.

In another general aspect, the invention features a method, and corresponding software and system, including storing a plurality of messages for a queue in a first data structure that is separate from a second data structure for the queue; committing a transaction associated with the messages; and reading at least some of the messages from contiguous memory locations.

This aspect can include one or more of the following features.

The method further includes storing a pointer to the first data structure in the second data structure.

Reading at least some of the messages from contiguous memory locations includes reading at least some of the messages from the first data structure.

Committing the transaction includes moving the messages from the first data structure to the second data structure.

Reading at least some of the messages from contiguous memory locations includes reading at least some of the messages from the second data structure.

The first data structure is stored in volatile memory and the second data structure is stored in non-volatile memory.

The method further includes moving the messages from the first data structure to a third data structure; and storing a pointer to the third data structure in the second data structure.

Reading at least some of the messages from contiguous memory locations includes reading at least some of the messages from the third data structure.

Aspects of the invention can include one or more of the following advantages.

A compound commit operation guarantees successful writing of a record to each of a plurality of queues without requiring concurrent locking of more than one queue, increasing utilization of computation resources. Writing messages in a large write transaction to a separate data structure avoids having to scan past the records of the large write transaction when reading other messages. Writing messages in a write transaction into a separate data structure or into a write buffer before adding them to a queue reduces a number of other messages interleaved with the messages in the write transaction, and increases input/output (I/O) efficiency.

Other features and advantages of the invention will become apparent from the following description, and from the claims.

DESCRIPTION

1 Overview

Figure 1A:
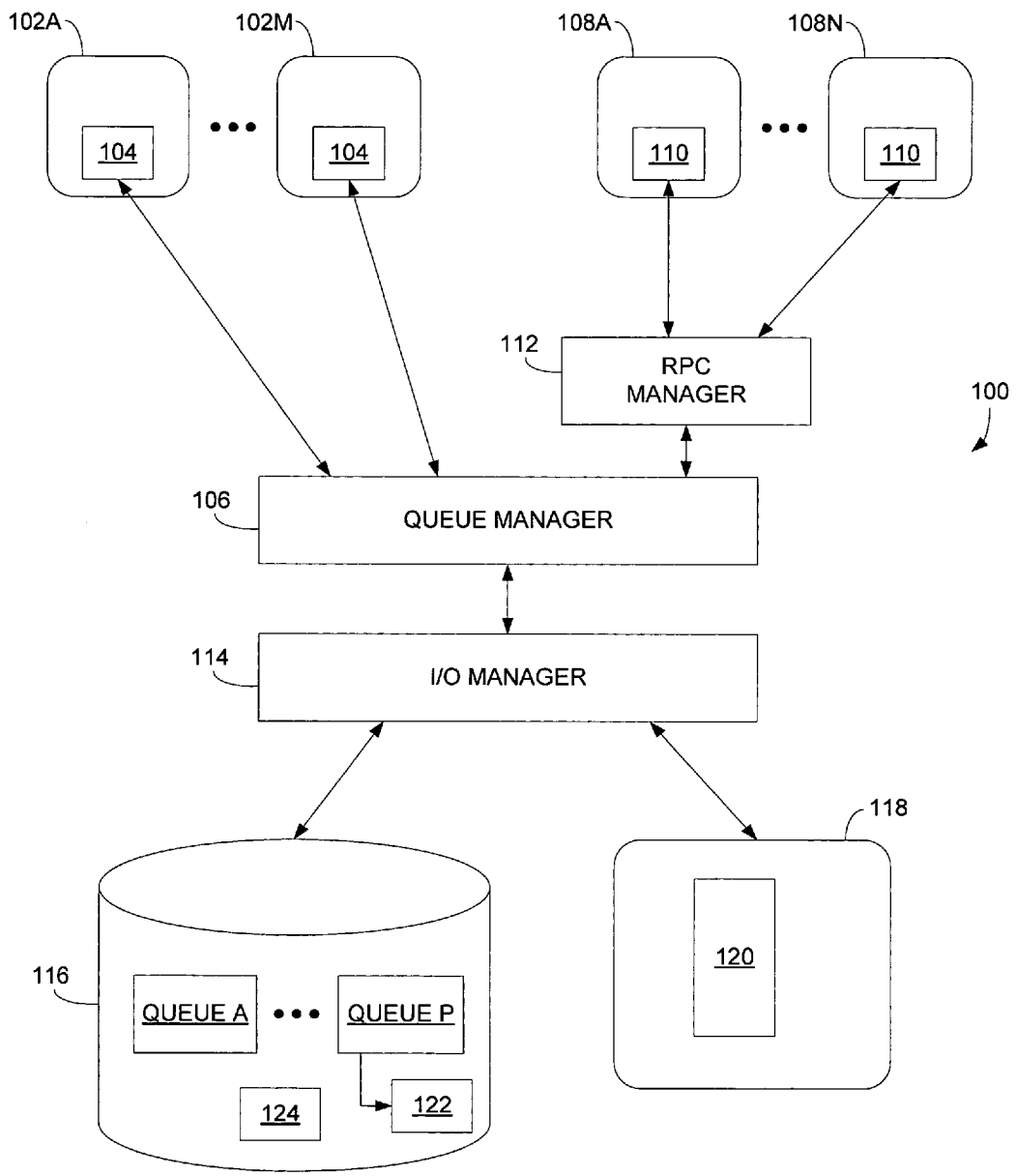
FIG. 1A is a diagram of a queueing system.

FIG. 1A shows a queueing system 100 in which a set of trusted access entities 102A-102M each includes a queue transaction module 104 for interacting directly with a queue manager 106. The queueing system 100 also includes a set of untrusted access entities 108A-108N each including a remote queue transaction module 110 for interacting with the queue manager 106 through a remote procedure call (RPC) manager 112.

The queueing system 100 provides a mechanism for passing messages between the access entities through one or more message queues. The access entities provide interfaces for modules to interact with the queueing system 100. For example, a "publisher" computational module in a distributed computing system can pass messages including processed data elements to one or more "subscriber" computational modules.

The queue manager 106 interacts with an input/output (I/O) manager 114 that manages memory storage for a set of message queues with corresponding queue data structures QUEUE_A-QUEUE_P that are each assigned storage space (e.g., a set of disk pages) in a volatile memory store 118 (such as a semiconductor random access memory (RAM)), which is a temporary working storage that provides relatively fast access for reading and writing data. The I/O manager 114 also manages a non-volatile memory store 116 (such as a magnetic disk system), which is a permanent storage that provides relatively more persistence of data and which may provide relatively slower access for reading and writing than the volatile memory store. Optionally, there is a single I/O manager handling the I/O for all the queues, or there are multiple I/O managers running in parallel, each handling the I/O for a subset of the queues.

Figure 1B:
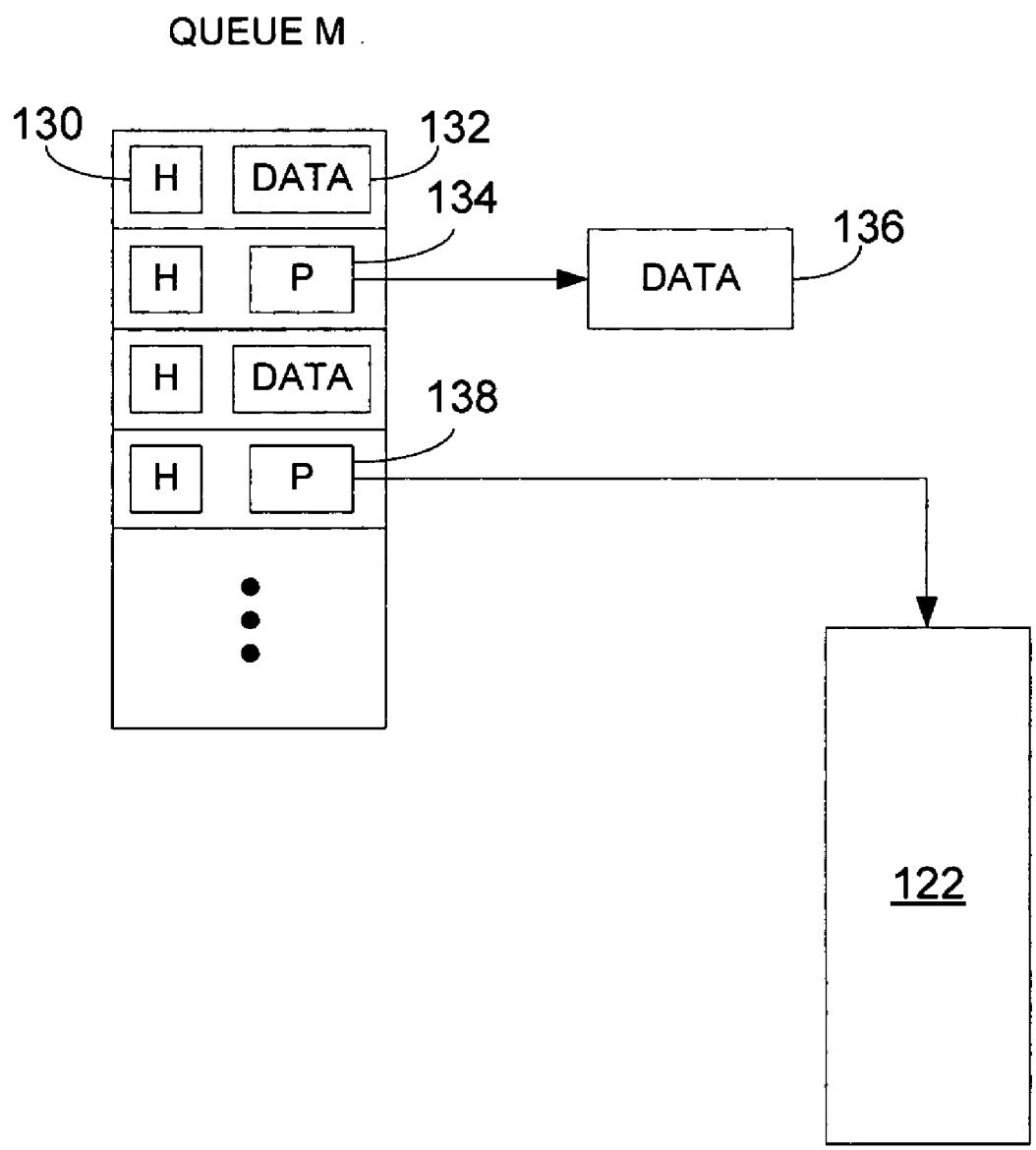
FIG. 1B is a diagram of a queue data structure.

A queue data structure stores records including "message records" (also called simply "messages") that include the message data being distributed, and "control records" that include information used by the queueing system 100 to manage the queue. FIG. 1B shows an exemplary queue data structure QUEUE_M containing a series of message records each including a message header 130 and message data 132. The queue can optionally store message data along with the message header 130, or alternatively can store a pointer 134 along with the message header 130 specifying an address of externally stored message data 136. In a "large transaction indirection technique" described below, a record can optionally include a pointer 138 to a large transaction data structure 122 that stores a sequence of messages.

The queueing system 100 supports various data distribution models including a publish-subscribe data distribution model. An access entity (trusted or untrusted) acting as a "publisher" to a queue can add one or more messages to the queue (also called a "topic") in a "write transaction." An access entity (trusted or untrusted) acting as a "subscriber" to a queue can read one or more messages from the queue in a "read transaction." Multiple publishers can add messages to the same queue, and multiple subscribers can read the same messages from the same queue. The queue manager 106 removes a message from a queue after all subscribers to the queue have read the message. Alternatively, in a point-to-point data distribution model, multiple access entities can add messages to a queue, but each message is read from the queue by a single access entity. A "compound transaction" includes interaction with more than one queue, as described in more detail below.

The write transactions, read transactions and compound transactions described herein can be performed in manner that is consistent with one or more of the "ACID" properties of Atomicity, Consistency, Isolation, and Durability.

To initiate a write transaction, a publisher obtains a transaction identifier (ID) from the queue manager 106 and passes the message or messages to be added to a queue in the write transaction to the queue manager 106. The added messages are associated with the transaction ID of the write transaction in which they were added to the queue. The queue manager 106 passes the messages to the I/O manager 114 to write to volatile memory store 118 and eventually to non-volatile memory store 116. Alternative division of functions performed by the queue manager 106 and the I/O manager 114 can be used.

After the publisher supplies the queue manager 106 all the messages to be added in a write transaction, the publisher may request that the queue manager 106 "commit" or "roll back" the write transaction. In order to commit a write transaction, the queue manager 106 adds a "commit record" to the corresponding queue data structure in non-volatile memory. The commit record indicates that the messages of a committed write transaction ("committed messages") can be passed to a subscriber. Before a write transaction is committed, the associated messages are made durable by ensuring that they are synchronized from volatile memory to non-volatile memory (if they have not already been synchronized).

The queue manager 106 discards messages in a write transaction that has been rolled back if those messages have not been synchronized to non-volatile memory. If the messages have been synchronized to non-volatile memory, then a "roll back record" is written to the appropriate queue data structure to indicate that the messages in that transaction will not be committed and that the messages can eventually be discarded. In some implementations, if a write transaction is not committed or rolled back after a predetermined amount of time (e.g., one hour), the queue manager 106 may optionally automatically roll back the transaction, for example, to prevent a build-up of these transactions from wasting storage space.

To initiate a read transaction, a subscriber obtains a transaction ID and receives the next unread message or messages from the queue manager 106. The I/O manager 114 handles retrieving the messages from the appropriate queue data structure and the queue manager 106 passes them to the subscriber. Messages may or may not be passed back in the same order in which they were written to the queue data structure since only committed messages are passed to a subscriber and messages that have been committed may be interleaved with messages that have not yet been committed. The queue manager 106 determines which messages in a queue to pass to the subscriber by building up a "read data structure," as described in more detail below.

In a "compound transaction" an access entity can write to and/or read from more than one queue with all the messages being associated with the same transaction ID. A compound transaction may also be committed or rolled back. When a compound transaction is committed, in a "compound commit" operation, a commit record is added to each queue to which messages are being written in the compound transaction. These "queue commit records" are used to signal that the corresponding committed messages can be passed to a subscriber.

Before writing these "queue commit records," a "journal commit record" is written to a journal data structure 124 that includes the transaction ID of the compound transaction being committed. The journal commit record can also optionally include other information such as the access entities participating in the compound transaction and the queue data structures involved. The compound commit operation is performed as an atomic operation ensuring that either all of the messages being written in the transaction will be durably stored or none of them will be durably stored (e.g., all of the added messages will be rolled back upon failure). The writing of the journal commit record is the atomic action that completes the compound commit operation. If failure occurs after the journal commit record has been written, but before all of the queue commit records have been written, the queueing system 100 can recover based on the durably stored journal commit record and write the remaining queue commit records.

To increase I/O efficiency, the queue manager 106 optionally uses techniques to reduce interleaving of messages from different transactions by storing new messages for a queue in a data structure that is separate from the queue data structure. For example, the queueing system 100 includes two techniques to reduce this kind of message interleaving: a "write buffering technique" and a "large transaction indirection technique," described below.

In a write buffering technique, the I/O manager 114 first temporarily stores uncommitted messages for a queue in a write buffer 120 in volatile memory store 118. When the write transaction associated with the messages is committed, the messages are moved from the write buffer 120 to the appropriate queue data structure. The messages may also be moved from the write buffer 120 to the appropriate queue data structure before the write transaction is committed, for example, if the write buffer 120 is full or after a predetermined amount of time elapses. Alternatively, the write buffer 120 can be stored in non-volatile memory store 116 and still provide some of the same functionality (e.g., reducing interleaving of messages from different transactions).

In a large transaction indirection technique, a write transaction that includes a large number of messages (e.g., more than 10,000, 100,000, 1,000,000, etc., depending on the characteristics of the computing environment) is identified as a "large transaction" by the publisher. The queue manager 106 stores the messages of a large transaction in a large transaction data structure (LTDS) 122, and stores a pointer to the LTDS 122 in the queue data structure. The queue manager 106 may optionally automatically convert a write transaction to a large transaction on the fly after detecting a predetermined number of messages in the write transaction. Both the write buffering technique and the large transaction indirection technique can increase the likelihood that message data is stored in contiguous memory locations, thereby increasing I/O efficiency.

2 Adding and Reading Messages

The I/O manager 114 maintains messages for any particular write transaction in the order in which they were presented to the queue manager 106, when storing the messages to an ordered queue data structure in non-volatile memory 118. The order of messages stored in the queue data structure is determined, for example, by a linked list of disk pages that are currently part of the queue data structure. Messages for different write transactions may be interleaved in the queue data structure. If a new write transaction is initiated after a previously initiated write transaction is committed, then all messages associated with the new write transaction occur after all of the messages in the previous write transaction in the queue data structure.

A subscriber can initiate a read transaction in which the subscriber requests one or more messages from a queue. The messages received by the subscriber may come from one write transaction, from a subset of a write transaction, or from more than one write transaction. As described in more detail below, the queue manager 106 passes messages to a subscriber from committed write transactions. Messages that were written in the same write transaction are provided to a subscriber in the order of the write transaction. Messages from different write transactions are provided to a subscriber in the order in which the write transactions were committed. The same messages read by different subscribers to a queue are seen in the same order by those subscribers.

To the extent that messages from different write transactions are interleaved in the queue data structure, I/O efficiency of a read transaction may be reduced. For example, the queue manager 106 does not pass a message to a subscriber until it has determined that the message has been committed. The more data there is that separates a message and the commit record corresponding to that message, the more administrative resources are used (e.g., more memory, or more read operations). The messages associated with a write transaction (particularly the first messages in the write transaction) may be widely separated from the commit record for that write transaction, for example, if there is a large amount of time between when a message is added and when the associated write transaction is committed. During that time, the messages may be stored in the queue data structure interleaved with other messages (e.g., messages associated with other write transactions). Furthermore, the messages in that write transaction may be on widely separated disk pages. In a read transaction, the queue manager 106 may have to scan the queue data structure for a commit record and then go back and swap in all of the pages on which the messages for that write transaction are stored.

2.1 Write Buffering

FIGS. 2A-2E illustrate the state of a write buffer 120 and a queue data structure QUEUE_A during an exemplary execution of the write buffering technique described above. The write buffer 120 is a temporary storage for queue records (e.g., message records and "open" records that indicate a beginning of a write transaction). The write buffer 120 holds the records until the corresponding transaction has been committed or until the write buffer 120 is "full." The queue manager 106 may determine when the write buffer 120 is full based on a maximum amount of data, a maximum number of messages, or based on a combination of amount of data and number of messages. In this example, for illustrative purposes, the write buffer 120 holds a maximum of three messages. The write buffer 120 is implemented with an ordered data structure (e.g., a linked list) that preserves the order in which messages were added. The write buffer 120 and the queue data structure QUEUE_A are illustrated as lists in which messages are added to the "head" at the bottom of the list.

Figure 2A:
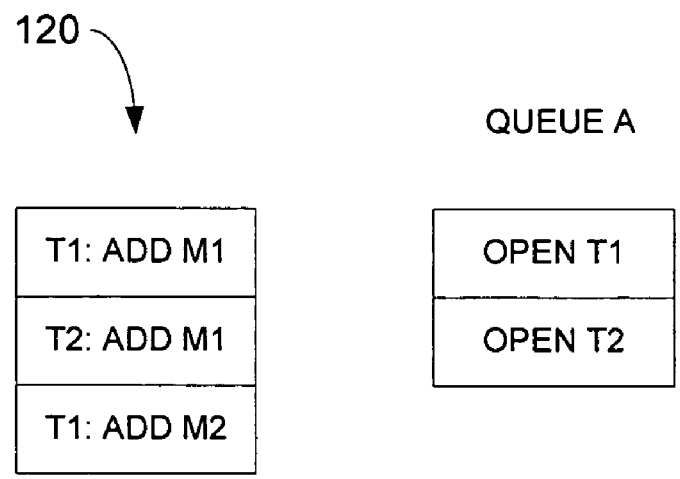
FIGS. 2A-2E are diagrams of a write buffer and a queue data structure.

Referring to FIG. 2A, the queue data structure QUEUE_A holds an "OPEN T1" record that indicates the start of a write transaction T1 and an "OPEN T2" record that indicates the start of a transaction T2. The write buffer 120 holds messages with headers: "T1: ADD M1," "T2: ADD M1," and "T1: ADD M2." The message data for each message is also stored in the write buffer 120 along with the corresponding message header. In this example, the two messages associated with write transaction T1 are interleaved with a message associated with write transaction T2, for example, because T1 and T2 were written concurrently by different publishers.

Figure 2B:
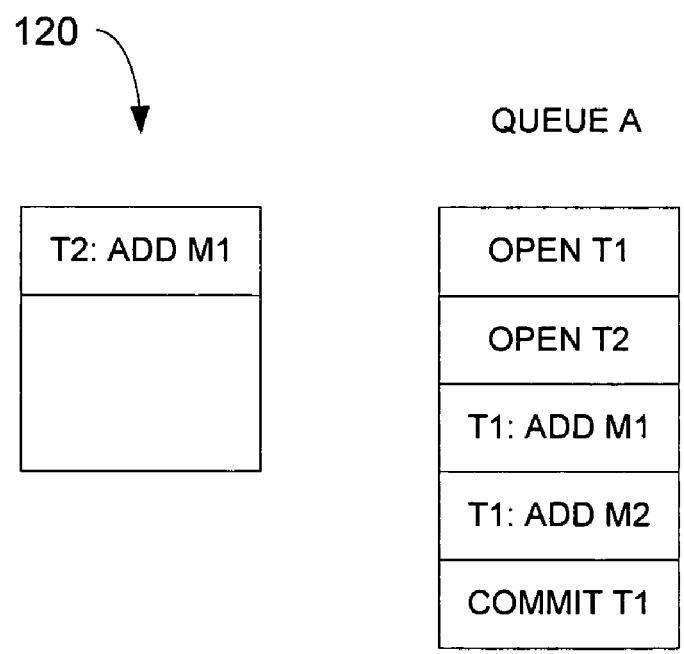

Referring to FIG. 2B, the queue manager 106 performs a commit operation for write transaction T1 after moving messages M1 and M2 for transaction T1 (including message headers and associated message data) to QUEUE_A and ensuring the messages have been synchronized to non-volatile storage. A commit record "COMMIT T1" is written to QUEUE_A after the messages to complete the commit operation. After the T1 messages are moved to QUEUE_A, a single T2 message remains in the writer buffer (since T2 has not yet been committed).

Figure 2C:
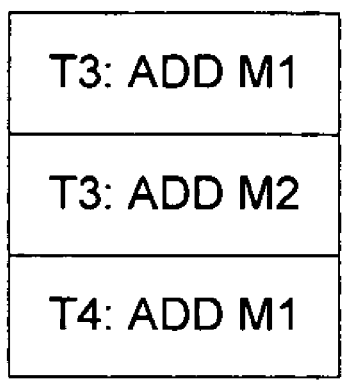
Figure 2C:
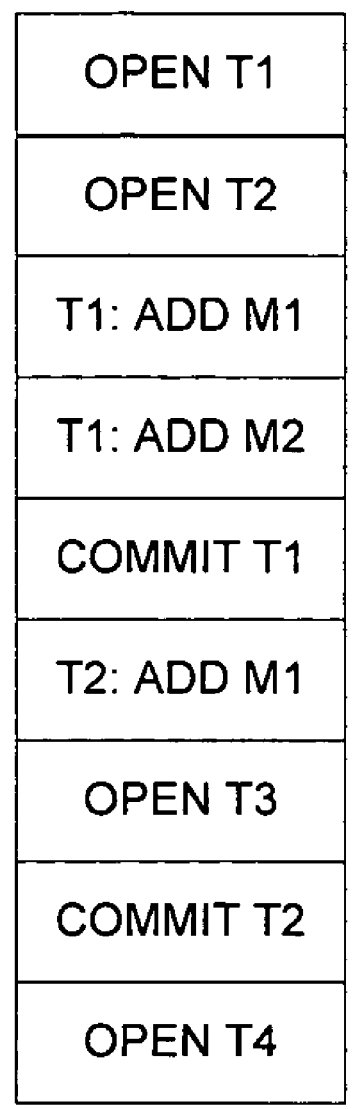

Referring to FIG. 2C, a publisher opens a new write transaction T3 and adds two messages with headers "T3: ADD M1" and "T3: ADD M2" to the queue, both of which are stored in the write buffer 120 which has two empty slots. Then the queue manager 106 performs a commit operation for write transaction T2, after moving the sole T2 message M1 with header "T2: ADD M1" to QUEUE_A. Then a publisher opens a new write transaction T4 and adds a message with header "T4: ADD M1" to the queue in the last remaining write buffer 120 slot. Though messages associated with write transactions T1 and T2 were initially interleaved, they have been de-interleaved and stored contiguously in the queue data structure QUEUE_A as part of the transfer from the write buffer 120 to QUEUE_A.

Figure 2D:
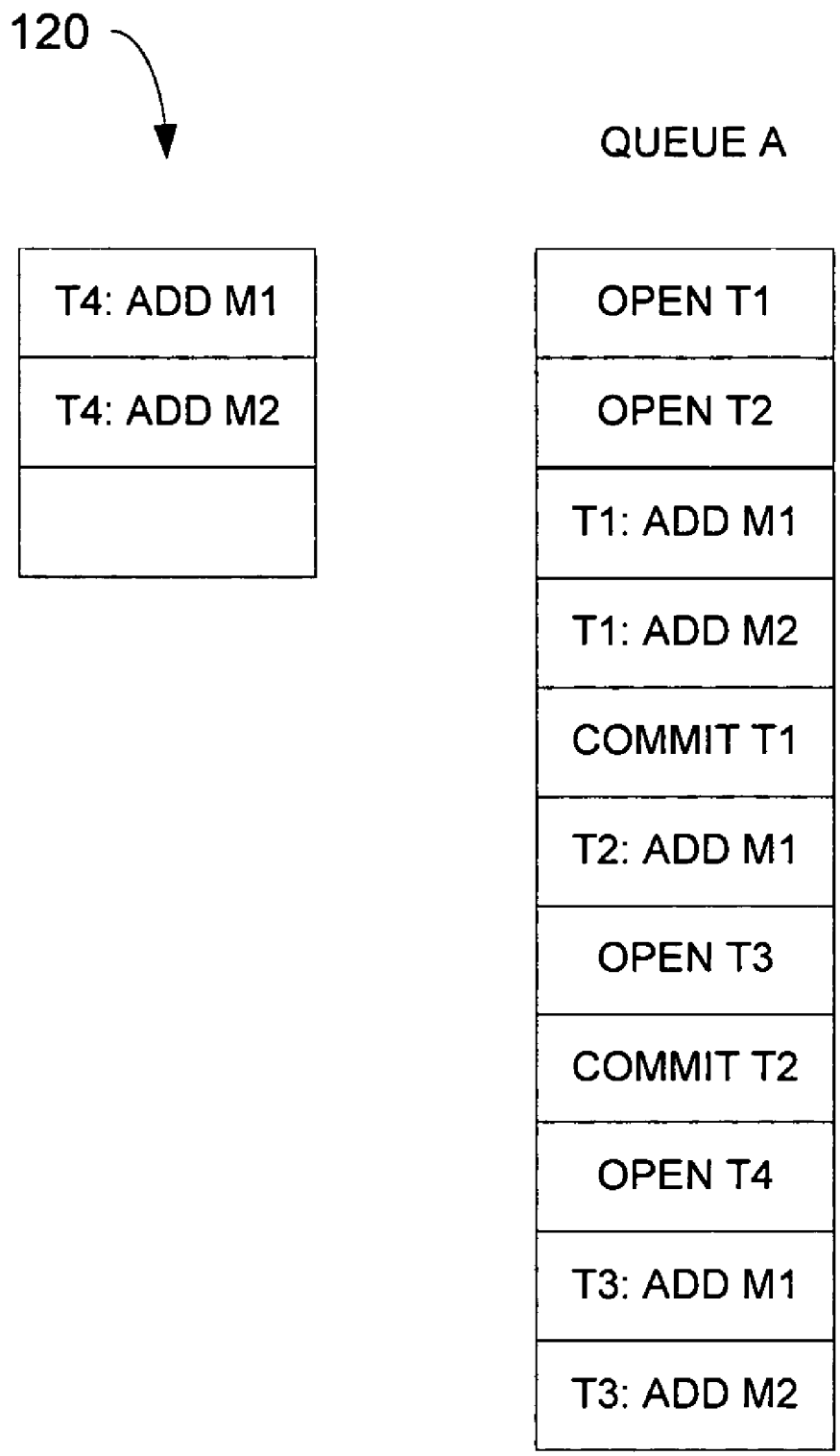

Referring to FIG. 2D, when the publisher adds a second message for T4, since the write buffer 120 is full, the queue manager 106 transfers the messages associated with T3 from the write buffer 120 to QUEUE_A. This transfer opens space in the write buffer 120 for the second T4 message. Thus, messages in a write transaction may be transferred from the write buffer 120 before being committed.

Figure 2E:
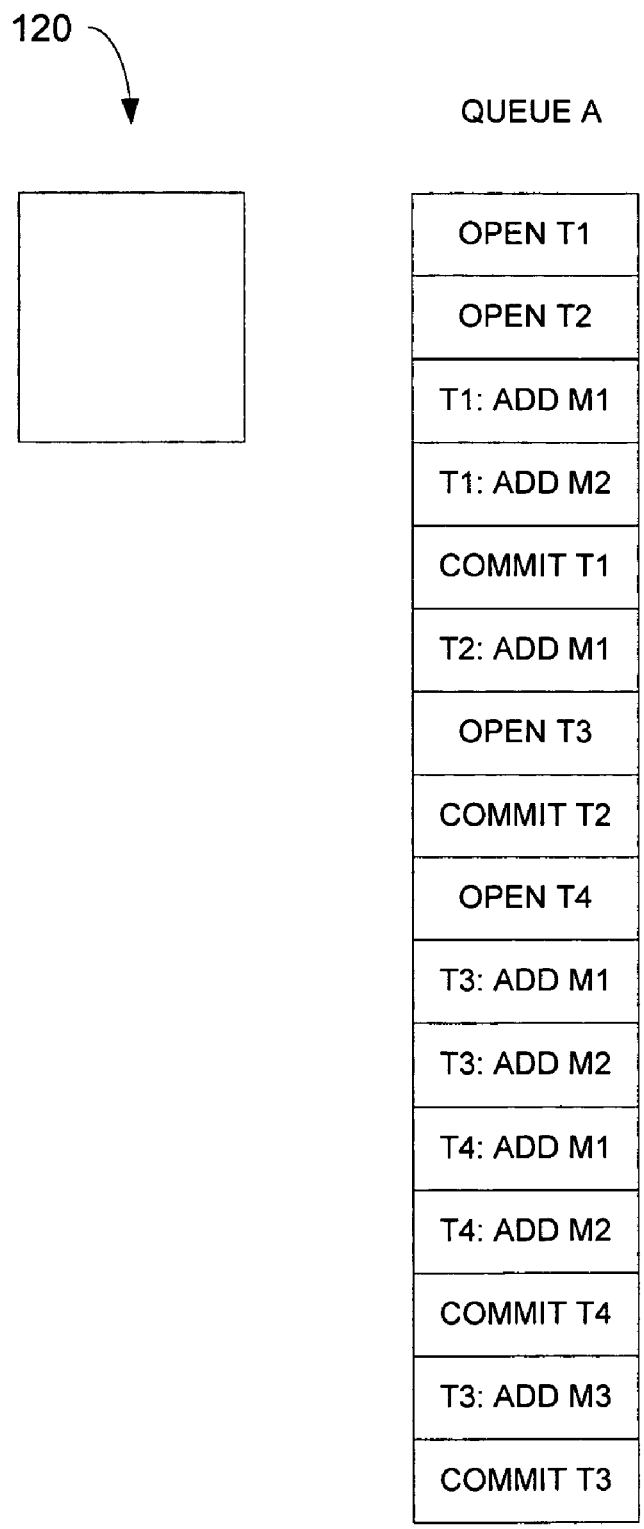

Referring to FIG. 2E, the queue manager 106 performs a commit operation for write transaction T4, receives a new T3 message, and performs a commit operation for write transaction T3. This example illustrates that while write buffering reduces interleaving of messages (or "temporal fragmentation"), some temporal fragmentation may still occur using write buffering due to filling of the write buffer 120. Alternatively, when the write buffer 120 fills, one or more write transactions can be converted to a large transaction, freeing space in the write buffer 120 without causing temporal fragmentation in a queue data structure.

Figure 3A:
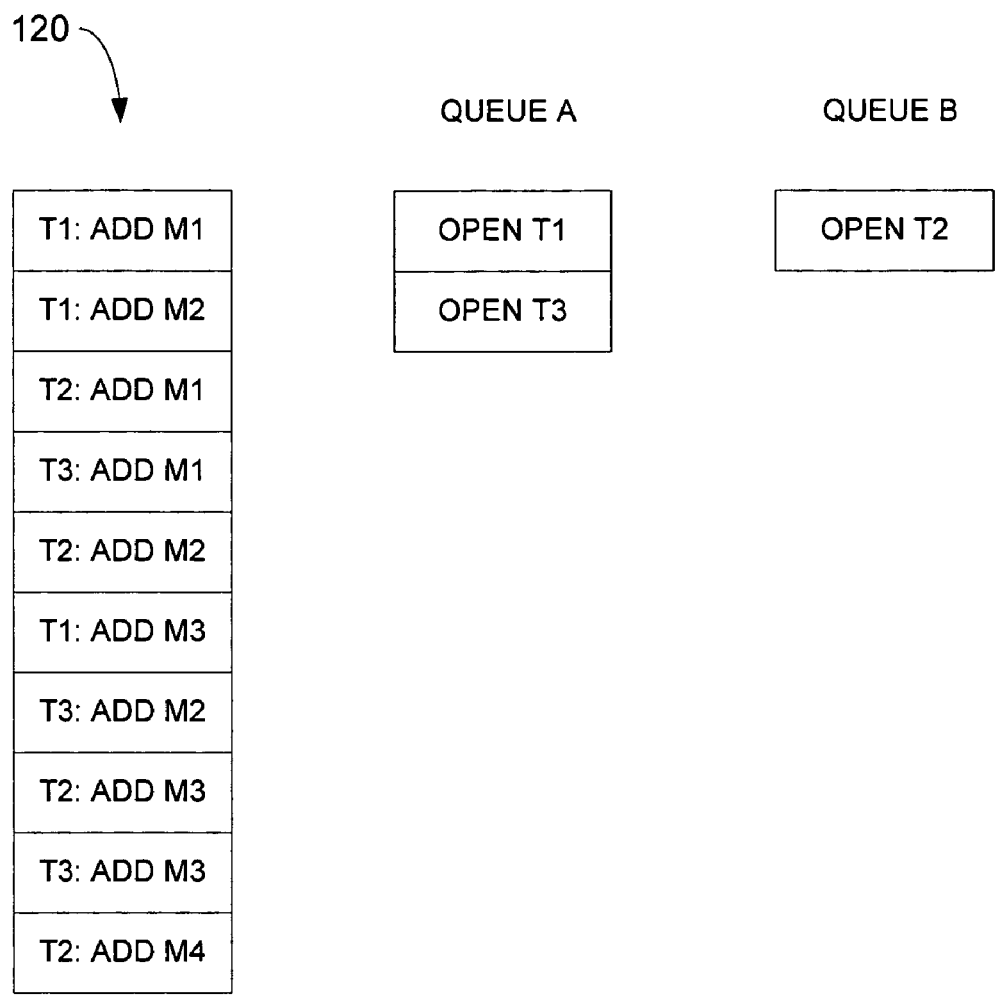
FIGS. 3A and 3B are diagrams of a write buffer and two queue data structures.
Figure 3B:
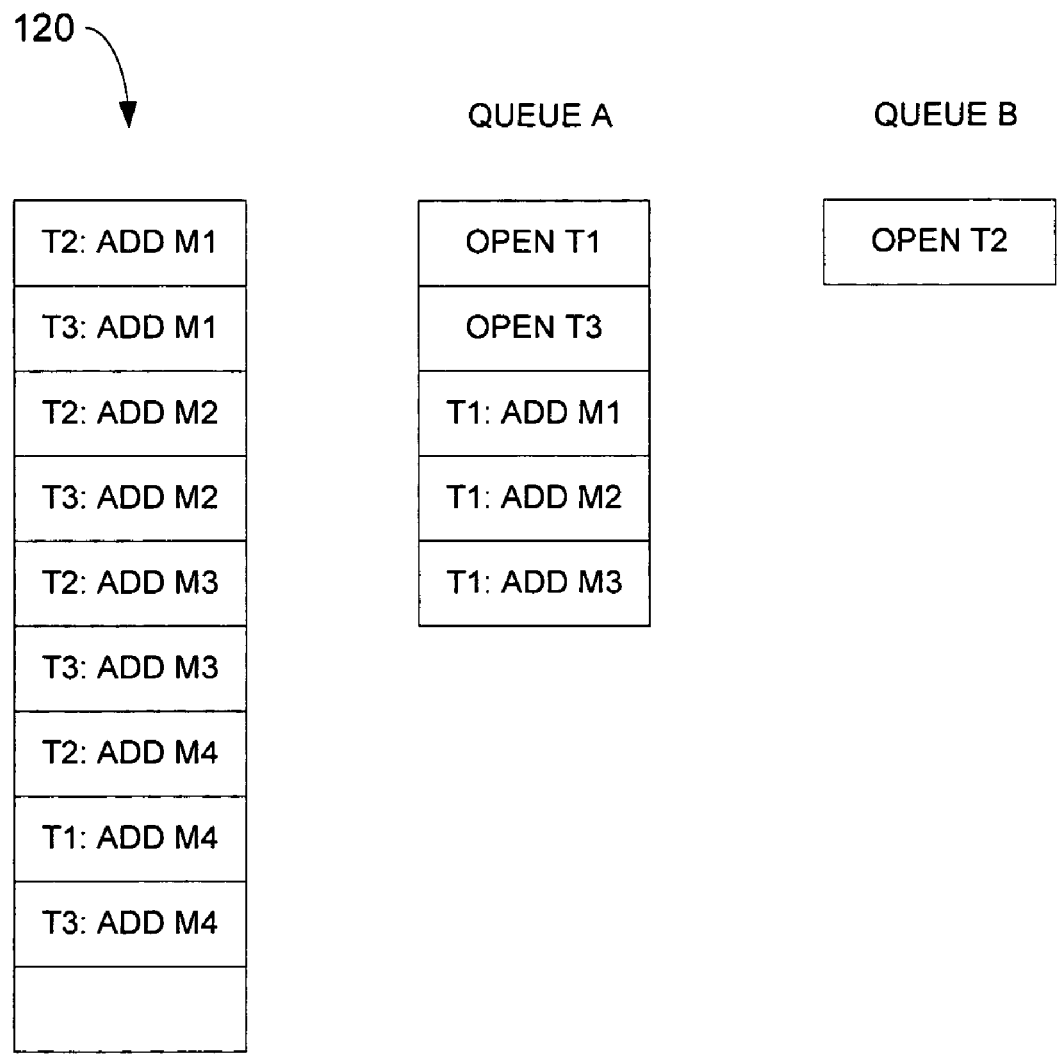

In some implementations each queue has its own write buffer. Alternatively, the write buffer 120 may hold messages for more than one queue. In one example, messages for three write transactions T1-T4 are added to two queues. FIG. 3A shows the state of the write buffer 120 and queue data structures QUEUE_A and QUEUE_B when the write buffer 120 is full (in this example, the write buffer 120 holds 10 messages). FIG. 3B shows the state of the write buffer 120 and queue data structures QUEUE_A and QUEUE_B after two new messages are added (for write transactions T1 and T4). Messages associated with the oldest transaction, T1, are transferred to QUEUE_A, freeing space in the write buffer 120 for the new messages.

2.2 Read Data Structure

The queue manager 106 builds up a read data structure by sequentially scanning message records in a queue and reading only the message headers to determine with which transaction each messages is associated. The queue manager 106 uses the read data structure to keep track of potentially multiple write transactions. For each queue, the queue manager 106 stores a read data structure for each subscriber to that queue.

Figure 4:
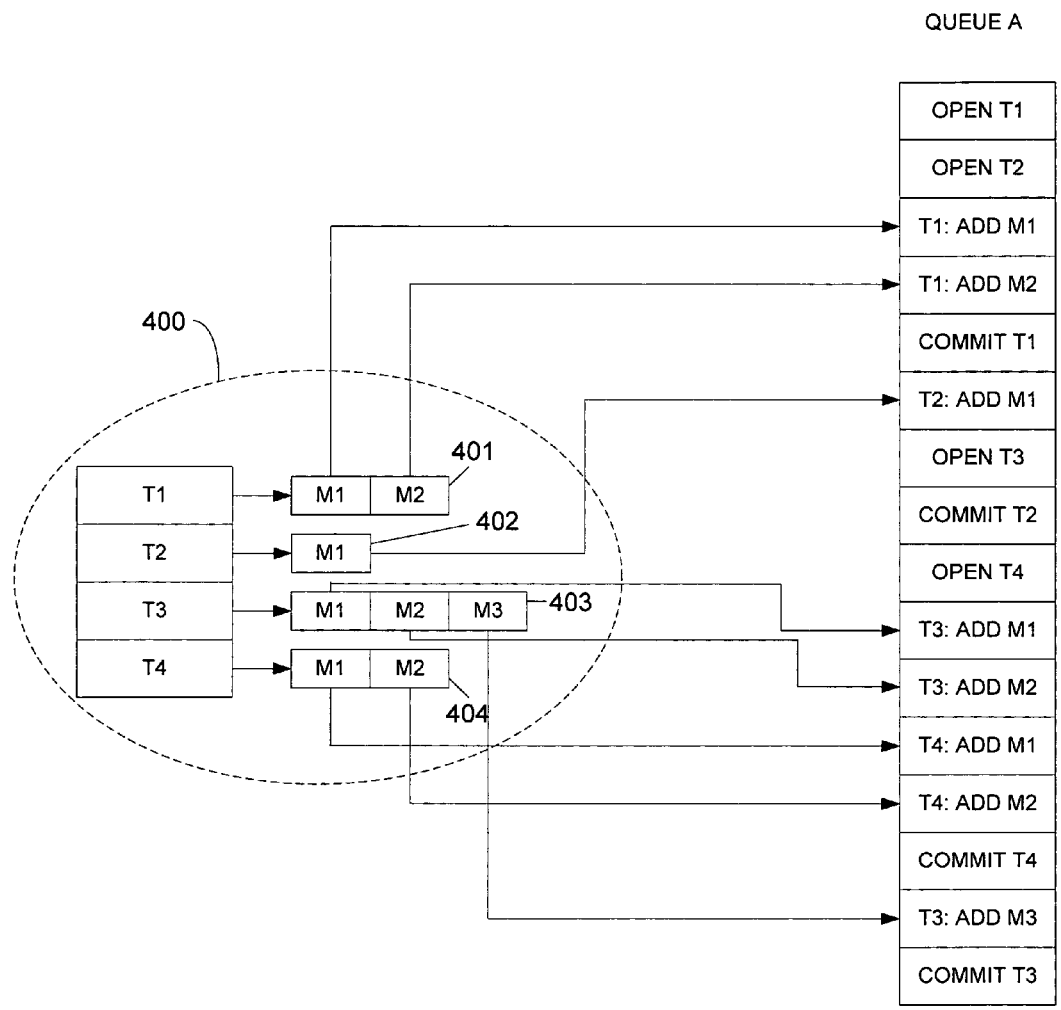
FIG. 4 is a diagram of a queue data structure and a corresponding read data structure.

FIG. 4 shows an exemplary read data structure 400 corresponding to QUEUE_A. In this example, the read data structure 400 includes an ordered list of first-in/first-out (FIFO) sub-lists 401-404. Each time the queue manager 106 encounters a message corresponding to a new write transaction, a new FIFO sub-list is added to the read data structure 400 identified by the transaction ID for that write transaction. The queue manager 106 adds to each FIFO sub-list a pointer to each message associated with the corresponding write transaction in the order in which they are scanned (i.e., the order in which they were added to the queue).

In scanning the queue data structure QUEUE_A shown in FIG. 4, the queue manager 106 generates a first FIFO sub-list 401 for write transaction T1 with pointers to messages M1 and M2. The queue manager 106 does not start passing messages back to the corresponding subscriber (in response to a read transaction) until confirming that the messages have been committed (i.e., until after scanning to a commit record for the associated transaction). After reaching the commit record for T1, the FIFO sub-list 401 for T1 is complete and the queue manager 106 temporarily stops building up the read data structure 400, retrieves the next message based on a pointer in the FIFO sub-list 401, and passes the message to the subscriber when the subscriber asks for a new message. After all the messages in the completed FIFO sub-list 401 have been passed to the subscriber, the queue manager 106 starts scanning QUEUE_A again to continue building up the read data structure 400 until the next FIFO sub-list 402 is complete. The queue manager alternates between handing messages to the subscriber from a completed FIFO sub-list and scanning the queue data structure to build up the read data structure. In this example, the messages M1 and M2 for T4 are passed to the subscriber before the messages M1-M3 for T3 since the commit record for T4 occurs before the commit record for T3. In alternative implementations, the queue manager can transition from handing messages to a subscriber to building up the read data structure before all the messages in a completed FIFO sub-list have been passed to the subscriber.

Each FIFO sub-list is maintained until after the corresponding subscriber receives all the messages in that FIFO sub-list, or until the queue manager 106 determines the corresponding write transaction will not be committed (e.g., after reading a roll back record). After a read transaction is committed, a commit record is written to the journal data structure 124 indicating which messages have been read by the subscriber. After the queue manager 106 finishes building up the read data structure 400, the read data structure 400 is retained for the next read transaction from the same queue for the same subscriber.

2.3 Large Transaction Indirection

Figure 5:
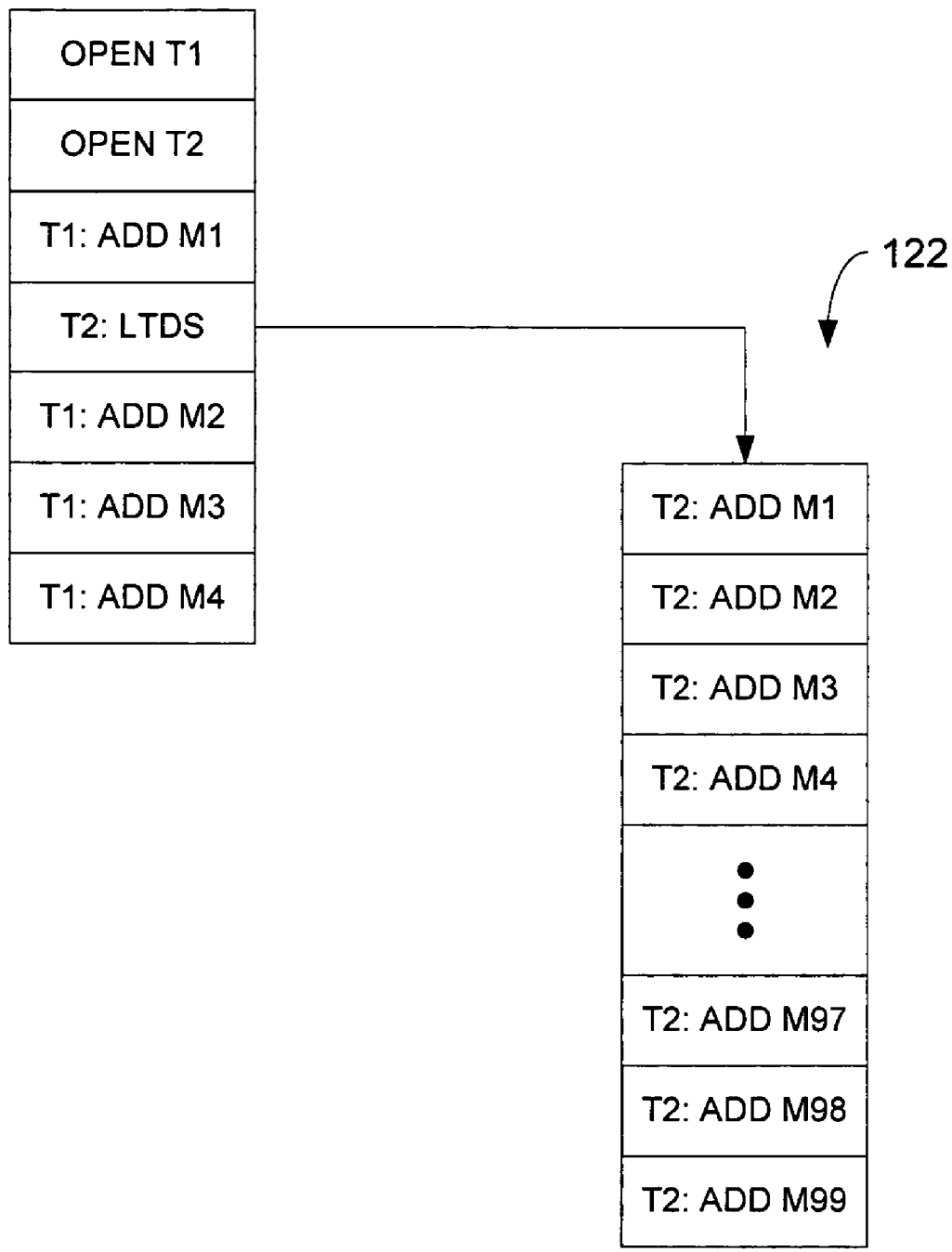
FIG. 5 is a diagram of a queue data structure and a large transaction data structure.

Referring to FIG. 5, when the queue manager 106 opens a large transaction T2, the queue manager 106 allocates a large transaction data structure (LTDS) 122 in the non-volatile memory store 116. As messages arrive for the large transaction, they are written directly to the LTDS 122 as a contiguous list of messages. When the large transaction is committed, the queue manager 106 closes the LTDS 122 and stores a pointer to the LTDS 122 in an indirect message 500 in the queue data structure QUEUE_P. The indirect message 500 also includes the transaction ID for the large transaction T2.

When the queue manager 106 builds up a read data structure for QUEUE_P, T1 messages are scanned twice—once when writing the pointers to the FIFO sub-list of the read data structure, and once when reading the messages to pass back to the subscriber. This double scanning would be inefficient if the large number of messages in the large transaction T2 were stored in QUEUE_P. Instead, when the queue manager 106 is building up the read data structure for QUEUE_P and scans the single indirect message 500, the queue manager 106 passes messages to the subscriber directly from the LTDS 122 without necessarily needing a FIFO sub-list for T2. None of the large transaction messages need to be scanned before they are passed back to the subscriber since a large transaction is automatically indicated as committed. Also, another function of scanning, "uninterleaving" messages from different transactions, is not necessary. After passing back all of the messages in the large transaction T2, the queue manager 106 returns to the queue data structure.

A large transaction can be an option selected by the publisher or deduced on the fly by the queue.

3 Compound Commit

In a compound commit operation, the queue manager 106 ensures that all of the added messages of a compound transaction that writes to multiple queues have been durably stored. Part of the compound commit operation includes writing commit records to those queues. It is useful to provide a mechanism to allow one or more access entities to concurrently access the queues while the compound commit operation is being performed, without allowing the access entities to interfere with the compound commit operation.

The queue manager 106 indicates that the messages of a compound transaction have been durably stored (i.e., synchronized to non-volatile memory) by writing a journal commit record to the journal data structure 124. Subsequently, the queue manager 106 writes queue commit records to each of the queues to which messages are being written in the compound transaction (e.g., to enable the queues to be scanned for commit records for building up the read data structure). Since the queue data structures have limited storage space, it is possible that some of the queues will not have enough space left to write a commit record within the timeout period (e.g., 5 seconds) for the compound commit operation. Even if the queue data structure has available space at the beginning a of compound commit operation, a concurrent write operation can use up the space before the queue commit record is written. Lack of space in a queue for a commit record is a potential problem, since the journal data structure 124 would indicate that a message has been committed but there would be no corresponding commit record in the queue to enable a subscriber to receive that message.

In one approach to managing queue commit records for a compound commit operation, the queue manager 106 ensures that enough space for a commit record is available in each of the queues by concurrently locking each queue while writing the commit records to prevent space from being used up during the commit operation. In second and third approaches, to perform the compound commit operation more efficiently, the queue manager 106 uses a method for guaranteeing successful writing of a commit record to each of multiple queues without requiring concurrent locking of more than one queue. Each of these three approaches is described in more detail below.

Figure 6:
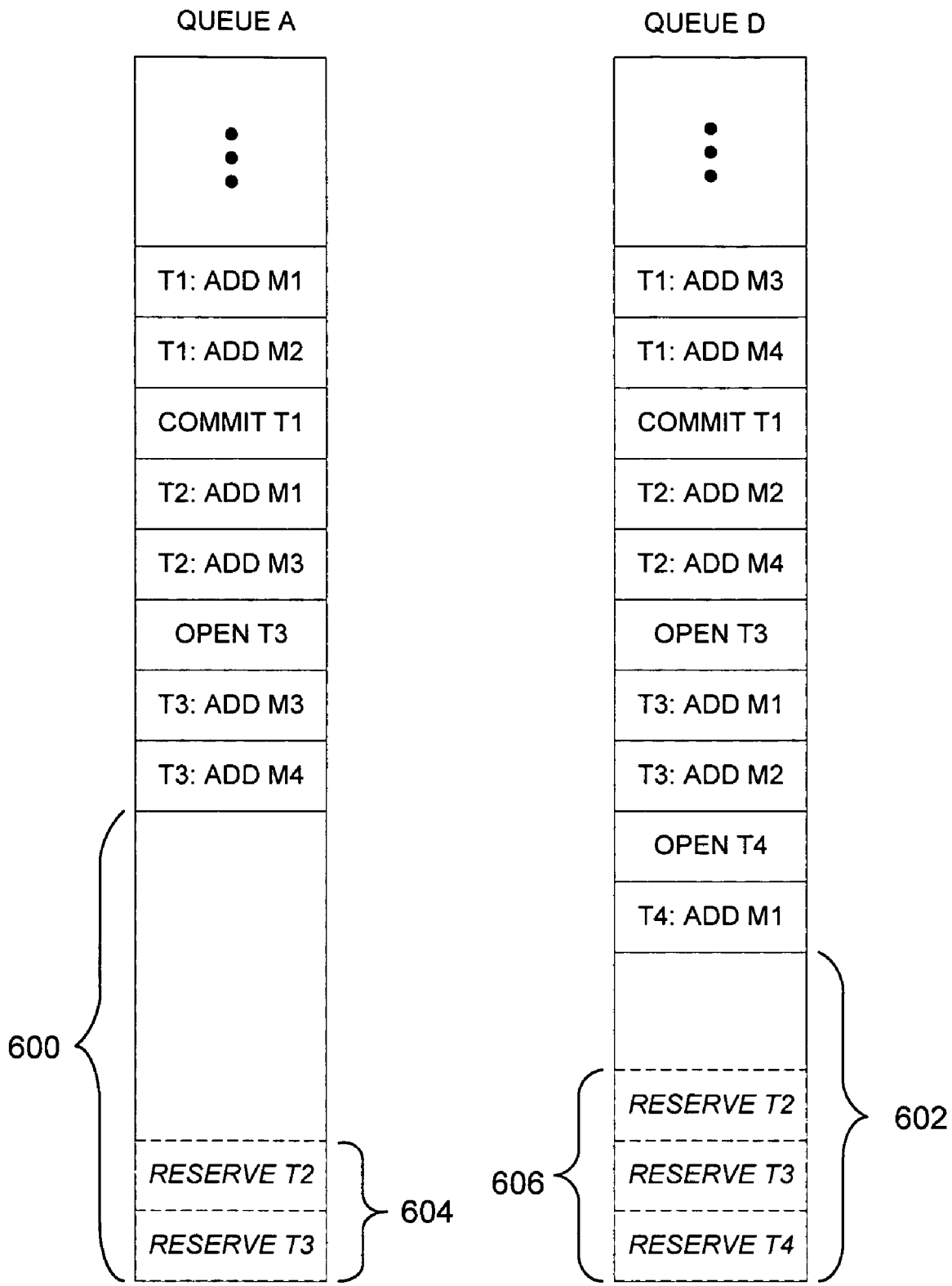
FIG. 6 is a diagram of queue data structures that are part of a compound commit operation.

Referring to FIG. 6, queue data structures QUEUE_A and QUEUE_D include messages for compound transactions with transaction IDs T1, T2 and T3, and a write transaction with transaction ID T4. The compound transaction T1 has been committed, and commit records for T1 have been written to QUEUE_A and QUEUE_D. Transactions T2, T3 and T4 have not yet been committed. Operations on QUEUE_A and QUEUE_D associated with a compound commit operation for compound transaction T2 are described below for each of the three exemplary approaches.

3.1 First Approach

Figure 7:
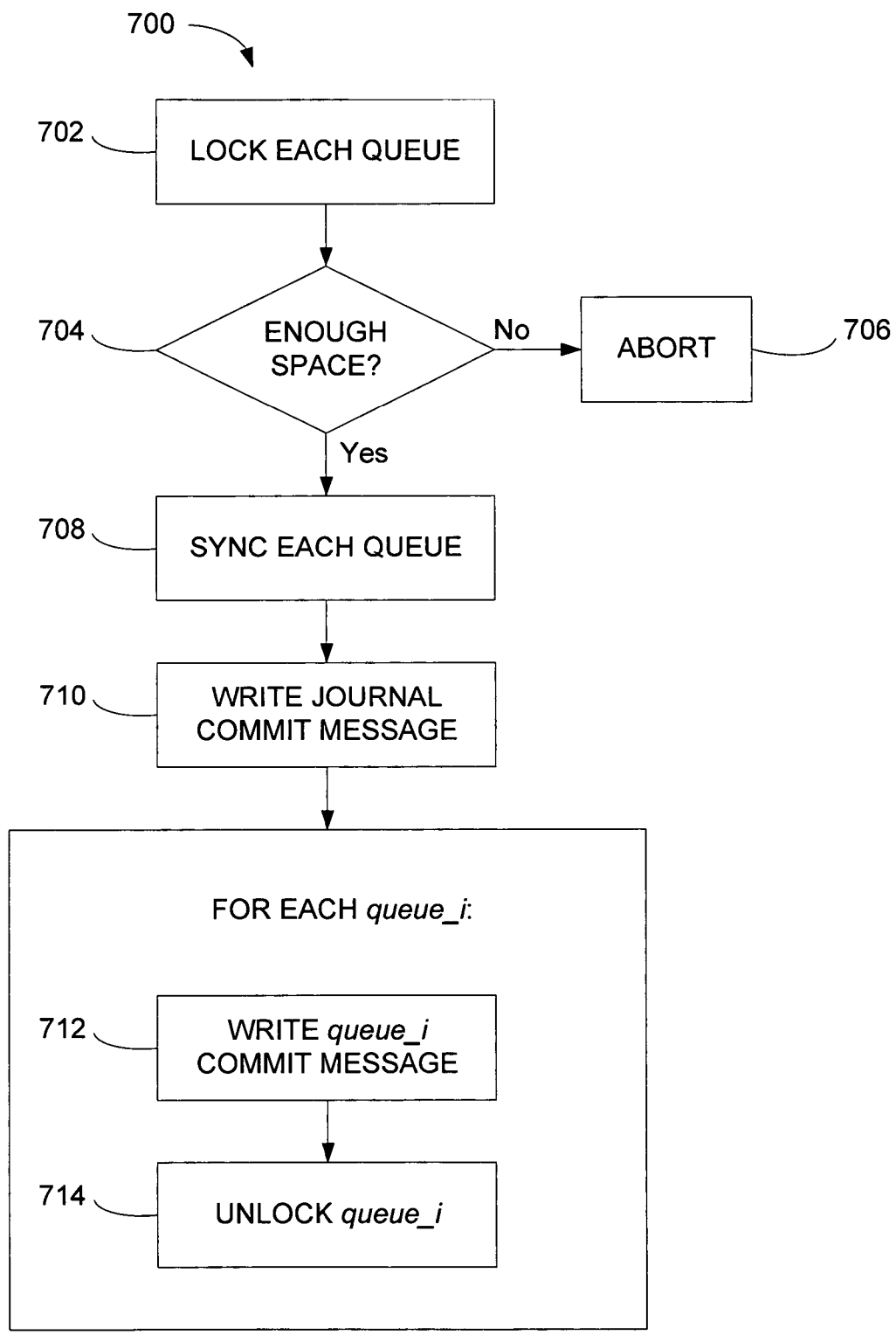
FIG. 7 is a flowchart for compound commit operation.

FIG. 7 shows a flowchart for a commit record writing operation 700. The queue manager 106 locks 702 each of the queues that is included in the compound transaction. In the example of FIG. 6, the queue manager 106 locks QUEUE_A and QUEUE_D (e.g., by setting a lock flag). This locking prevents any other process from taking up available space in the queue data structure.

After locking 702 each queue, the queue manager 106 checks 704 the storage space available in each queue. In the example of FIG. 6, the queue data structure QUEUE_A has a block of storage 600 available and the queue data structure QUEUE_B has a block of storage 602 available. The queue manager 106 compares the amount of space available in each queue with the amount of space that would be used to write a commit record for the compound transaction being committed. If any of the queues does not have enough available space reserved for a commit record, then the queue manager 106 aborts 706 the compound commit operation. The queue manager 106 may attempt the compound commit operation at a later time and/or attempt to acquire more storage space for one or more of the queues.

If the queues do have enough storage space reserved for commit records, then queue manager 106 synchronizes 708 each queue to ensure that any messages stored in volatile memory have been moved to non-volatile memory. After each queue has been synchronized, the queue manager 106 writes 710 a commit record to the journal data structure 126. After writing the journal commit record, the queue manager 106 writes 712 a commit record to each queue. After writing the commit record to a queue, the queue manager 106 unlocks 714 that queue.

The writing of the journal commit record is the atomic action defining the point at which the compound commit operation is recoverable. If the queueing system 100 fails during the compound commit operation before the queue manager 106 writes 710 the journal commit record, then the commit operation is aborted for all of the queues (since some queues may not have been synchronized to non-volatile storage and no commit records have been written to any of the queues). If the queueing system 100 fails during the compound commit operation after the queue manager 106 writes 710 the journal commit record, then the commit operation is made complete for all of the queues (since each queue has been synchronized to non-volatile storage and the commit records can be recovered from the journal commit record).

3.2 Second Approach

In a second approach, the queue manager 106 compares the amount of space available in each queue with the amount of space that would be used to write a commit record for the compound write transaction being committed and any outstanding transactions (as used herein, "outstanding transactions" includes both compound transactions and write transactions). The queue data structure QUEUE_A includes a block of storage 604 reserved to write commit records for T2 and outstanding transaction T3. The queue data structure QUEUE_B includes a block of storage 606 reserved to write commit records for T2 and outstanding transactions T3 and T4.

Figure 8A:
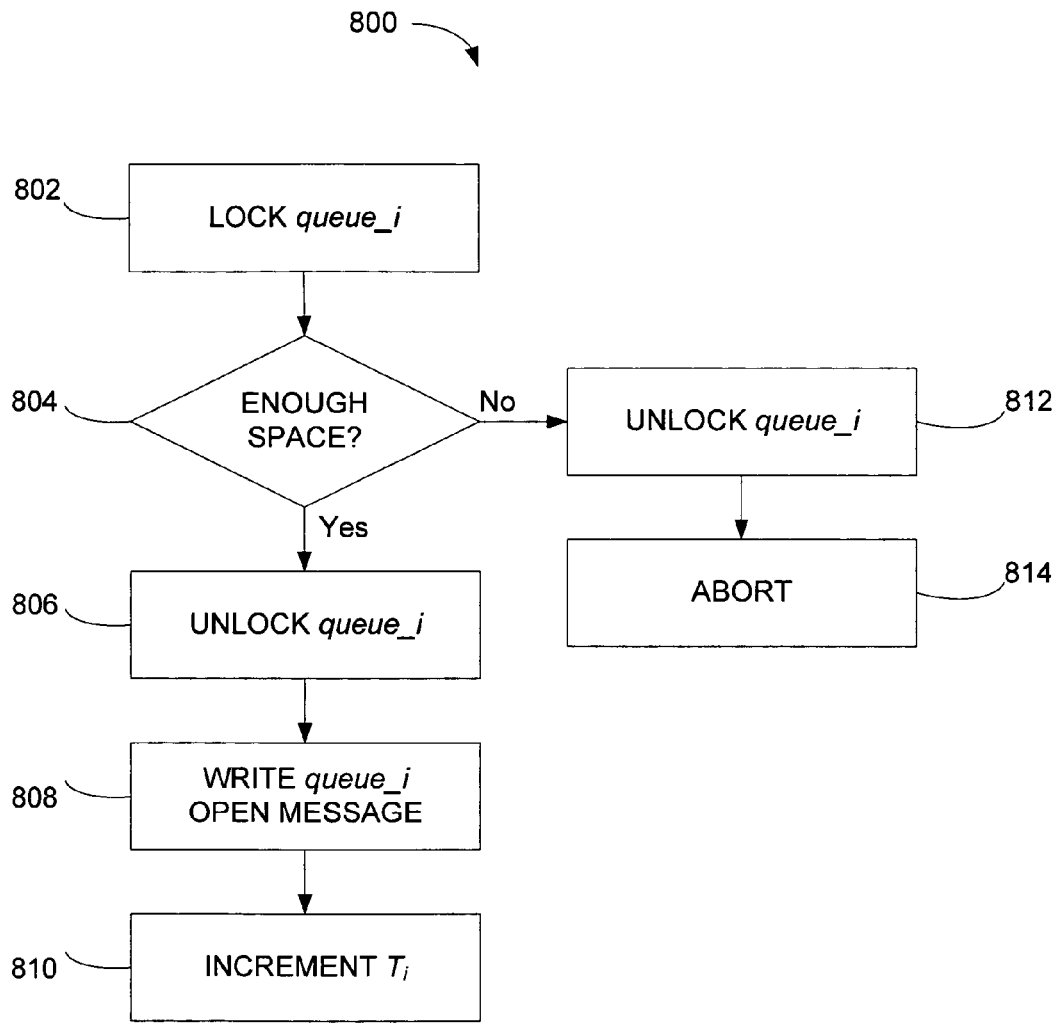
FIG. 8A is a flowchart for an open operation.

FIG. 8A shows a flowchart for an "open operation" 800 that is performed at the beginning of a write transaction. For each queue queue_i, the queue manager 106 keeps track of the number of outstanding transactions $T_i$ for which a commit record has not yet been written. Before a opening new transaction on queue_i and incrementing $T_i$, the queue manager 106 locks 802 and checks 804 the queue (a single queue for a simple write transaction or each queue to which messages are being added in a compound transaction) to ensure there is space for an "open record" and a commit record. The queue manager 106 compares the current available space with $D_o$, given by:

$$D_o = \text{size\_of}(1 \text{ open record}) + \text{size\_of}(1 \text{ commit record}) \times (T_i + 1)$$

If the available space is larger than or equal to $D_o$, then the queue manager 106 unlocks 806 queue_i and writes 808 an "open record" and increments 810 the number of outstanding transactions $T_i$. Otherwise, if the available space is smaller than $D_o$, then the queue manager 106 unlocks 812 queue_i and aborts 814 the open operation 800.

Figure 8B:
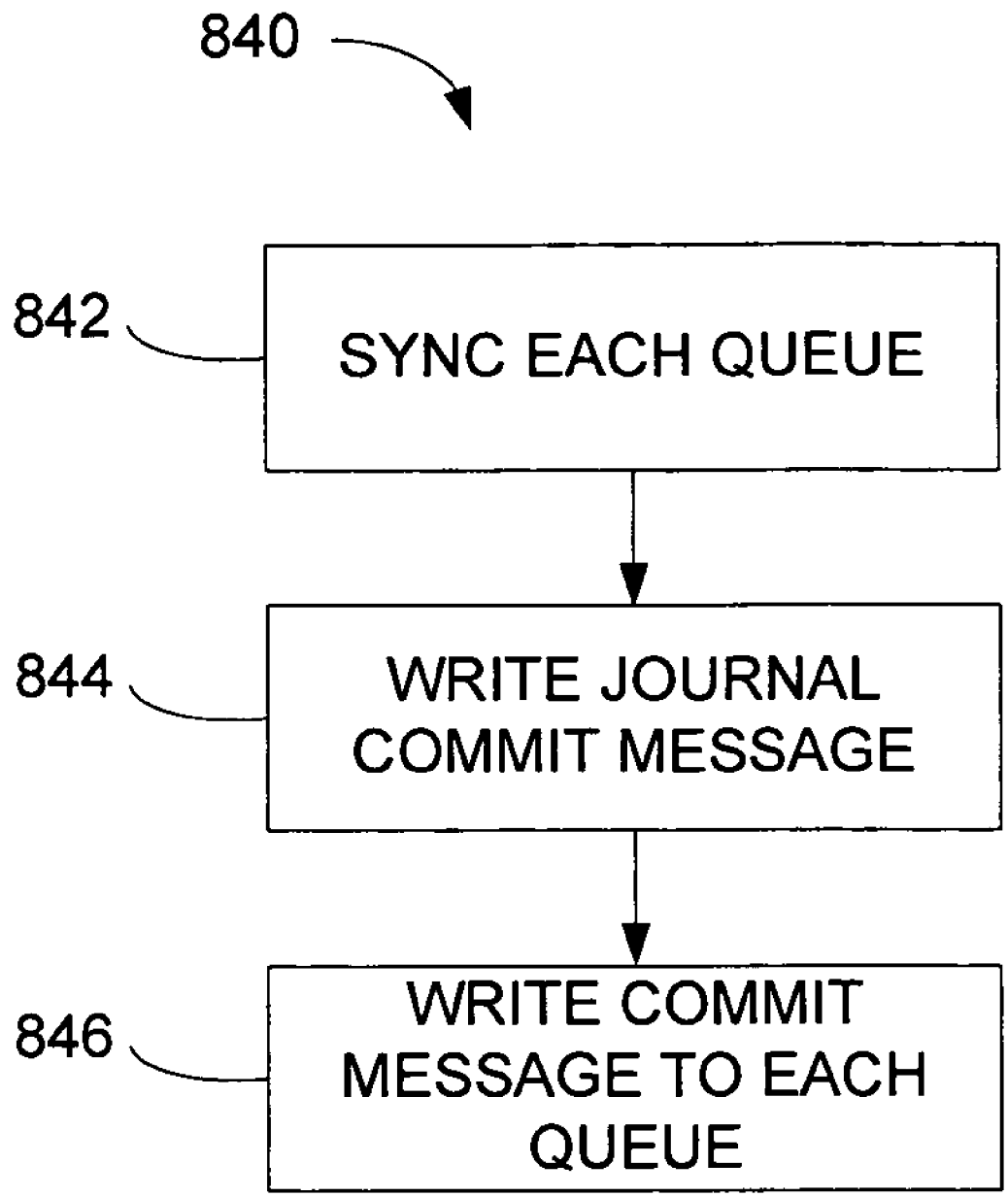
FIGS. 8B and 8C are flowcharts for a compound commit operation and an associated write operation, respectively.
Figure 8C:
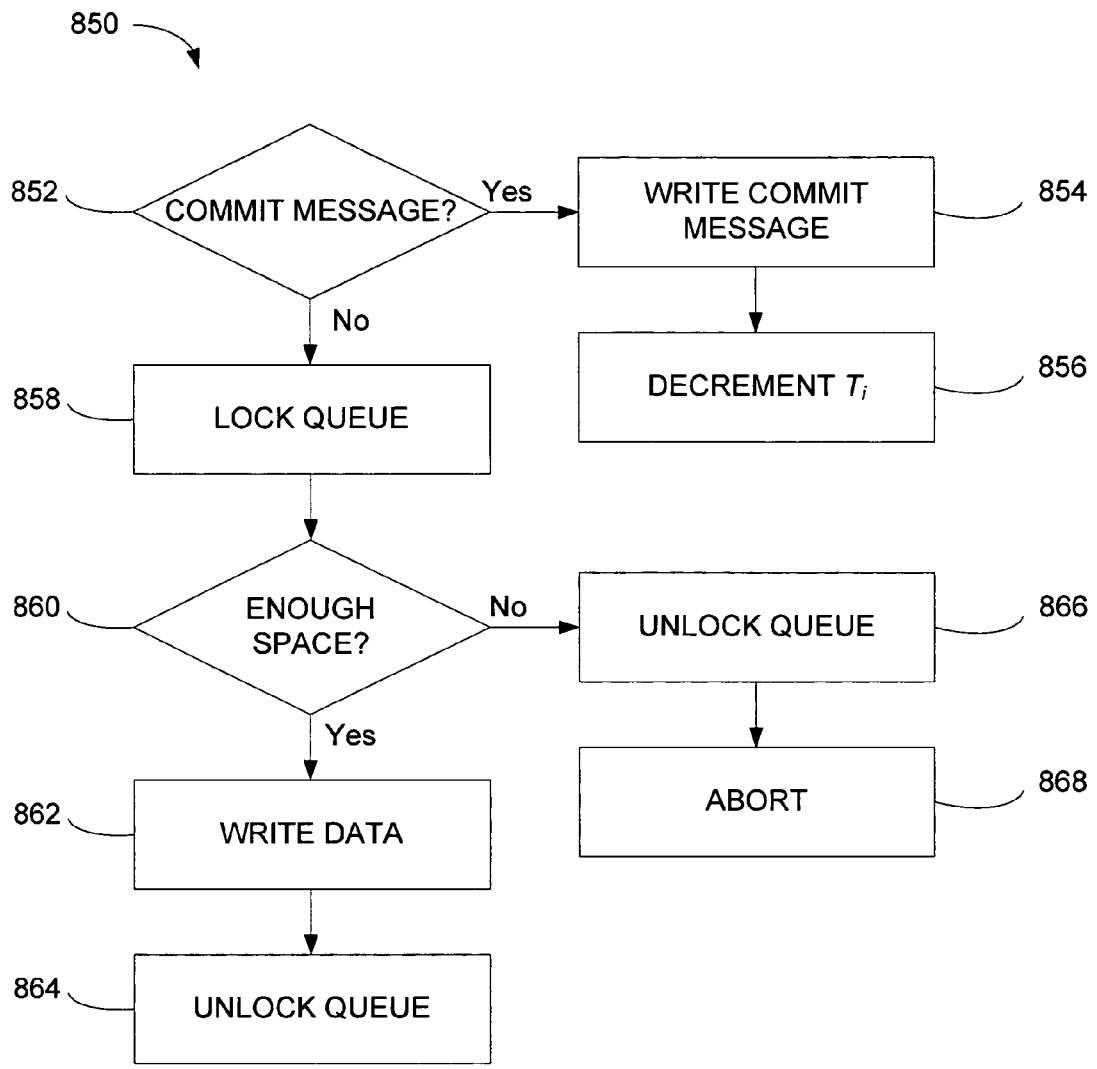

FIGS. 8B and 8C show a flowchart for a commit record writing operation 840 and an associated write operation 850, respectively. The queue manager 106 (or the I/O manager 114) uses the commit record writing operation 840 for a commit operation, and uses the write operation 850 (potentially concurrently) to write any data other than commit records to a queue. In this approach, the commit record writing operation 840 does not need to check for available space in the queues since the write operation 850 includes this check before writing any data to a queue data structure. The queue manager 106 ensures that each queue queue_i reserves enough space for a commit record for each of the $T_i$ outstanding transactions for that queue, as described in more detail below. Therefore, the queue manager 106 can safely assume that space has been reserved for each commit record when performing the commit record writing operation 840.

Referring to FIG. 8B, in the commit record writing operation 840, the queue manager 106 first synchronizes 842 each queue. After synchronizing each queue, the queue manager 106 writes 844 the journal commit record. After writing the journal commit record, the queue manager 106 writes 846 a commit record to each queue.

Referring to FIG. 8C, the queue manager 106 uses the write operation 850 for data to be written to a queue data structure. The queue manager 106 first determines 852 whether the data to be written is a commit record. If so, the queue manager 106 writes the commit record 854 and decrements 856 the number of outstanding transactions $T_i$. If not, the queue manager 106 locks 858 the queue and checks 860 the storage space available in the queue. The queue manager 106 compares the current available space with $D_w$, given by:

$$D_w = \text{size\_of}(\text{data to be written}) + \text{size\_of}(1 \text{ commit record}) \times T_i$$

where size_of (data) returns the size of data in the appropriate units (e.g., bytes). If the available space is larger than or equal to $D_w$, then the queue manager 106 writes 862 the data and unlocks 864 the queue. Otherwise, if the available space is smaller than $D_w$, then the queue manager 106 unlocks 866 the queue and aborts 868 the write operation 850. In this approach, only a single queue, the queue to which data is being written, is locked while storage space is checked.

3.3 Third Approach

Figure 9A:
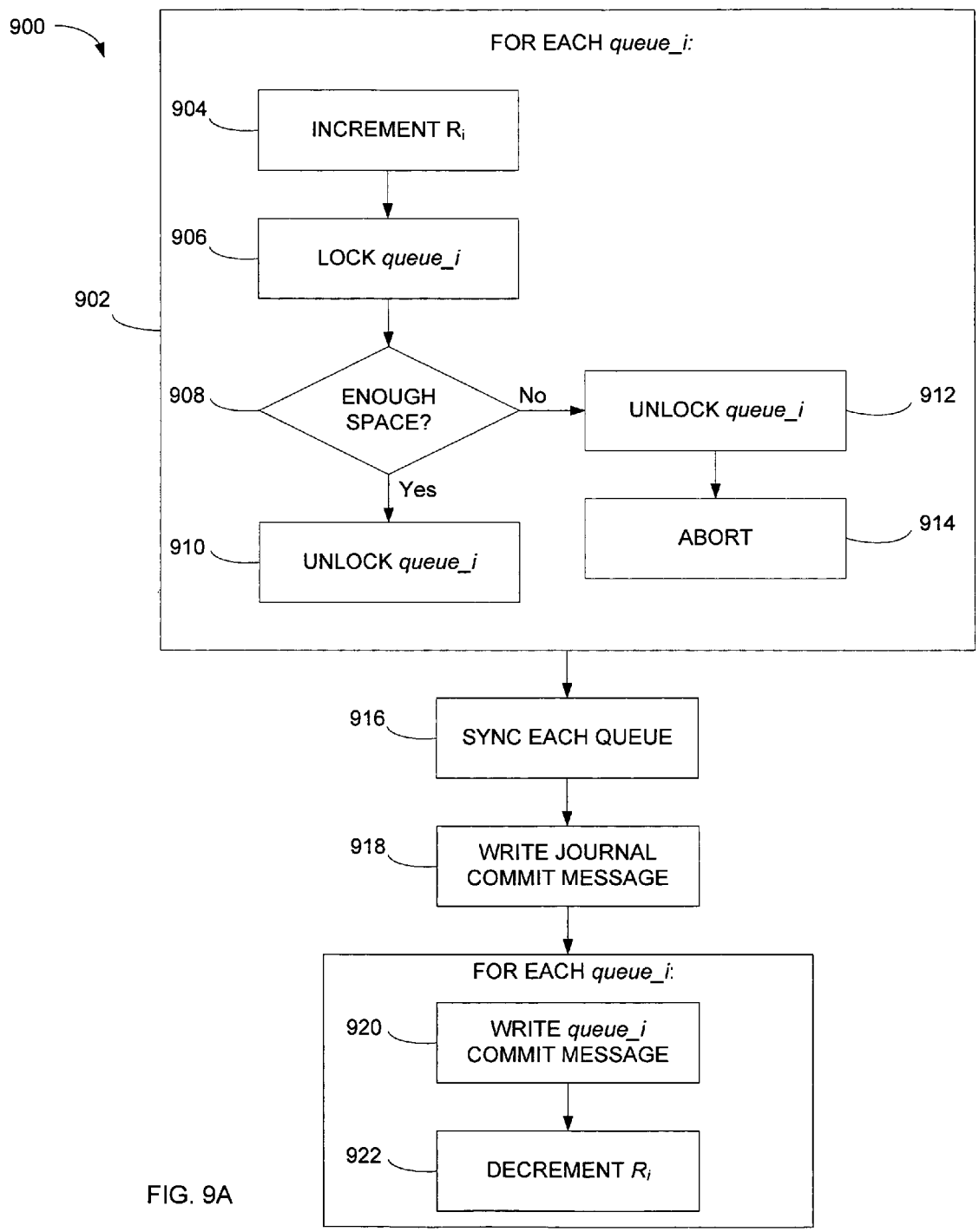
FIGS. 9A and 9B are flowcharts for a compound commit operation and an associated write operation, respectively.
Figure 9B:
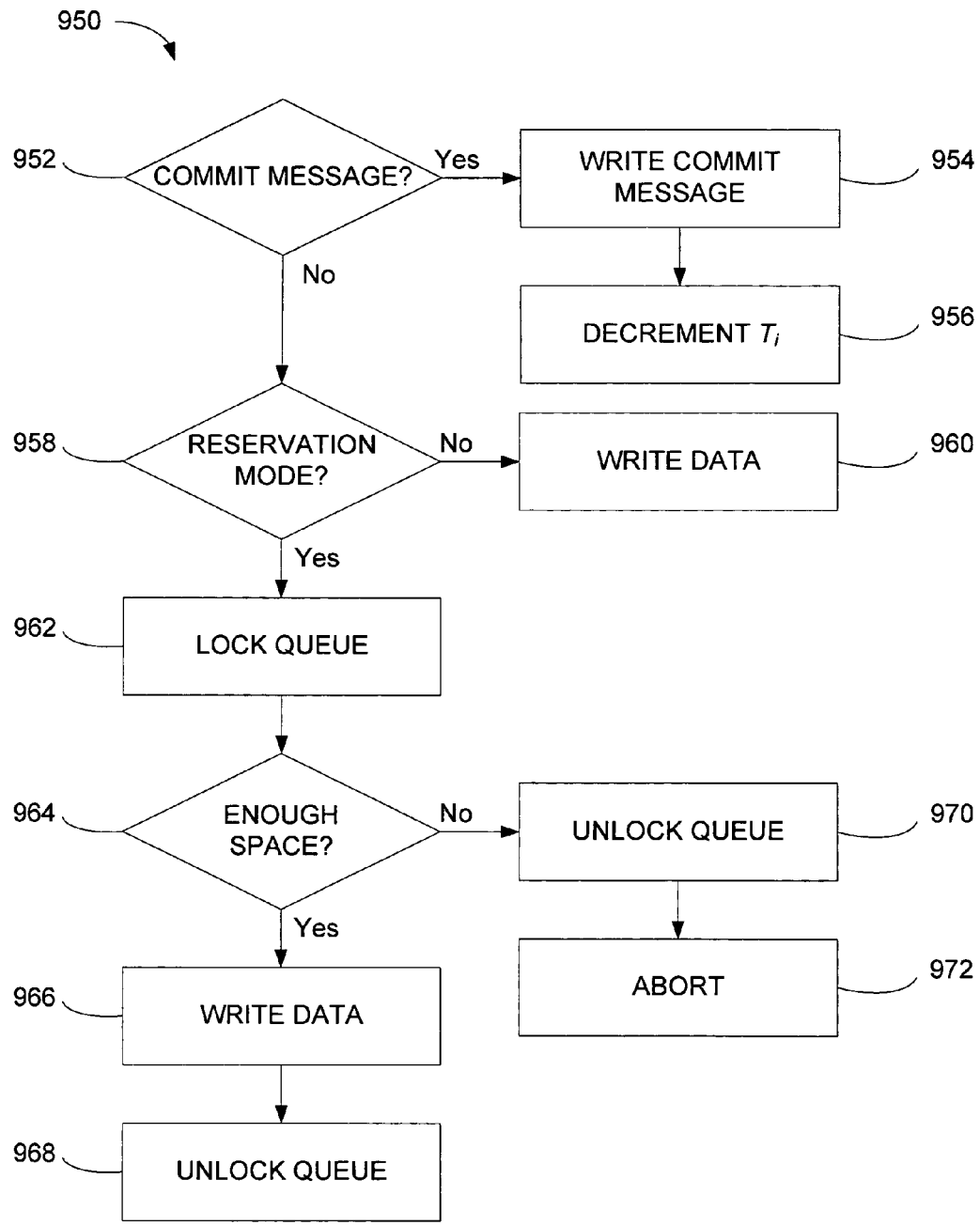

FIGS. 9A and 9B show a flowchart for a commit record writing operation 900 and an associated write operation 950. In this approach, the queue manager 106 uses the "open operation" 800 shown in FIG. 8A at the beginning of a write transaction. The commit record writing operation 900 and the write operation 950 both check for available space in the queues. Also, in this approach only a single queue is locked at a time. For each queue queue_i, the queue manager 106 keeps track of the number of outstanding transactions $T_i$ (incrementing $T_i$ using open operation 800). The queue manager 106 ensures that each queue data structure reserves enough space for a commit record for each of the $T_i$ outstanding transactions. However, in this approach, the queue manager 106 only locks a queue to check for space before writing data to a queue while a queue is in a "reservation mode." Reservation mode provides a way to signal that a commit operation is in progress without concurrently locking all participating queues.

Referring to FIG. 9A, in the commit record writing operation 900, the queue manager 106 first executes a loop 902 (or equivalent control structure) once for each queue queue_i included in the commit record writing operation 900 (i.e., where i=1 . . . number of queues in the operation 900). The loop 902 turns on reservation mode for queue_i in a way that can account for the possibility of multiple compound commit operations being performed concurrently. In this example, the loop 902 increments 904 a reservation mode counter $R_i$ for queue_i. The reservation mode counter starts at an initial value, e.g., $R_i=0$, in which queue_i is not in reservation mode. When $R_i>0$, queue_i is in reservation mode. This allows the reservation mode state of a queue to be responsive to the number of times the queue has been placed into reservation mode.

After incrementing the reservation mode counter, in the loop 902, the queue manager 106 locks 906 queue_i and checks 908 the storage space available in queue_i. The queue manager 106 compares the current available space with $D_c$, given by:

$$D_c = \text{size\_of}(1 \text{ commit record}) \times T_i$$

If the available space is larger than or equal to $D_c$, then the queue manager 106 unlocks 910 queue_i and continues. Otherwise, if the available space is smaller than $D_c$, then the queue manager 106 unlocks 912 queue_i and aborts 914 the commit record writing operation 900.

After the loop 902, the queue manager 106 synchronizes 916 each queue. After synchronizing each queue, the queue manager 106 writes 918 the journal commit record. After writing the journal commit record, the queue manager 106 writes 920 a commit record to each queue. After writing a commit record to a queue, the queue manager 106 decrements 922 the reservation mode counter for that queue.

Referring to FIG. 9B, the queue manager 106 uses the write operation 950 for data to be written to a queue data structure. The queue manager 106 first determines 952 whether the data to be written is a commit record. If so, the queue manager 106 writes the commit record 954 and decrements 956 the number of outstanding transactions $T_i$. If not, the queue manager 106 determines 958 whether the queue is in reservation mode (e.g., by determining whether $R_i>0$). If the queue is not in reservation mode, then the queue manager 106 writes 960 the data. If the queue is in reservation mode, then the queue manager 106 locks 962 the queue and checks 964 the storage space available in the queue. The queue manager 106 compares the current available space with $D_w$ as defined above for the second approach. If the available space is larger than or equal to $D_w$, then the queue manager 106 writes 966 the data and unlocks 968 the queue. Otherwise, if the available space is smaller than $D_w$, then the queue manager 106 unlocks 970 the queue and aborts 972 the write operation 950.

3.4 Other Approaches

Other approaches are possible for managing commit operations that guarantee successful writing of a commit record to each of multiple queues without requiring concurrent locking of more than one queue. For example, in a variation of the third approach, instead of using a count of all outstanding transactions $T_t$, the queue manager 106 uses the number of queues in reservation mode $R_t$ for calculations of $D_c$ and/or $D_w$. In some approaches, a commit operation is allowed to fail due to lack of space for queue commit records before the journal commit record is written.

4 Implementation

The queue management functions described herein can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The data structures described herein can be implemented as data structures stored in a computer readable medium or other organized data conforming to a data model stored in a data repository.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for writing data to a plurality of queues, each portion of a first data being written to a different corresponding one of the queues, the method including:
   without requiring concurrent locking of more than one queue, determining if a space is available in each queue for writing a corresponding portion of the first data, and if available, reserving the spaces in the queues to ensure that a space in a given queue remains available until a corresponding portion of the first data can be written to the given queue;
   writing each portion of the first data to a different corresponding one of the queues without locking the corresponding queue while writing the portion of the first data; and
   writing second data, different from the first data, to at least one queue of the plurality of queues while reserving space for the corresponding portion of the first data including locking the queue to which the second data is being written, determining that space is available in the queue for writing the corresponding portion of the first data and the second data, and writing the second data.

2. The method of claim 1, wherein writing each portion of the first data to a corresponding one of the queues occurs after reserving the spaces in the queues for all portions of the first data.

3. The method of claim 1, further including:
   after writing a portion of the first data in the corresponding queue, releasing the reservation of the space for the portion of the first data written in that queue.

4. The method of claim 1, wherein determining if the space is available in each queue and if available reserving the spaces includes, for each of multiple of the queues:
   locking the queue;
   determining if the space is available in the queue, after locking the queue;
   if available reserving the space; and
   unlocking the queue, after reserving the space.

5. The method of claim 1, wherein each portion of the first data written to a corresponding one of the queues includes a record.

6. The method of claim 5, further including writing a journal record before writing the records to any of the queues.

7. The method of claim 6, further including synchronizing each of the queues to non-volatile memory before writing the journal record.

8. The method of claim 5, further including, before writing data other than one of the records to a first of the queues, if a space has been reserved in the first queue, locking the first queue while determining whether additional space is available in the first queue for the other data before writing the other data to the first queue.

9. The method of claim 5, further including, before writing data other than one of the records to a first of the queues, if a space has not yet been reserved in the first queue, write the data to the first queue without necessarily requiring locking of the first queue.

10. The method of claim 1, wherein determining if the space is available in each queue for writing a corresponding portion of the first data includes ensuring that enough space in each queue is available for writing a commit record for any outstanding transactions with the queue.

11. The method of claim 10, further including:
   aborting the writing of the corresponding commit records to each of the plurality of queues after determining that enough space would not be reserved in at least one of the queues for writing a commit record for any outstanding transactions with the queue.

12. The method of claim 1, wherein reserving the spaces in the queues includes storing for each queue an indication of a respective size of the portion of the first data not yet written to that queue.

13. The method of claim 12, wherein storing for each queue an indication of a respective size of the portion of the first data not yet written to that queue includes incrementing a corresponding counter for each queue.

14. The method of claim 12, further including, after locking the queue to which the second data is being written and before writing the second data, determining that the size of the second data plus the size of the portion of the first data not yet written to that queue is available in that queue.

15. The method of claim 1, wherein writing first data to the plurality of queues is performed as an atomic operation ensuring that either all of the portions of the first data being written to a different corresponding one of the queues will be durably stored or none of the portions of the first data being written to a different corresponding one of the queues will be durably stored.

16. Software stored on a computer-readable storage medium, for writing data to a plurality of queues, each portion of a first data being written to a different corresponding one of the queues, the software including instructions for causing a computer system to:
  without requiring concurrent locking of more than one queue, determine if a space is available in each queue for writing a corresponding portion of the first data, and if available, reserving the spaces in the queues to ensure that a space in a given queue remains available until a corresponding portion of the first data can be written to the given queue;
  write each portion of the first data to a different corresponding one of the queues without locking the corresponding queue while writing the portion of the first data; and
  write second data, different from the first data, to at least one queue of the plurality of queues while reserving space for the corresponding portion of the first data including locking the queue to which the second data is being written, determining that space is available in the queue for writing the corresponding portion of the first data and the second data, and writing the second data.

17. The software of claim 16, wherein writing each portion of the first data to a corresponding one of the queues occurs after reserving the spaces in the queues for all portions of the first data.

18. The software of claim 16, wherein determining if the space is available in each queue and if available reserving the spaces includes, for each of multiple of the queues:
  locking the queue;
  determining if the space is available in the queue, after locking the queue;
  if available reserving the space; and
  unlocking the queue, after reserving the space.

19. The software of claim 16, wherein each portion of the first data written to a corresponding one of the queues includes a record.

20. The software of claim 19, further including, before writing data other than one of the records to a first of the queues, if a space has been reserved in the first queue, locking the first queue while determining whether additional space is available in the first queue for the other data before writing the other data to the first queue.

21. The software of claims 16, wherein determining if the space is available in each queue for writing a corresponding portion of the first data includes ensuring that enough space in each queue is available for writing a commit record for any outstanding transactions with the queue.

22. A system for writing data to a plurality of queues, each portion of a first data being written to a different corresponding one of the queues, the system including:
  means for determining, without requiring concurrent locking of more than one queue, if a space is available in each queue for writing a corresponding portion of the first data, and if available, reserving the spaces in the queues to ensure that a space in a given queue remains available until a corresponding portion of the first data can be written to the given queue; and
  means for writing each portion of the first data to a different corresponding one of the queues without locking the corresponding queue while writing the portion of the first data; and
  means for writing second data, different from the first data, to at least one of the plurality of queues while reserving space for the corresponding portion of the first data including locking the queue to which the second data is being written, determining that space is available in the queue for writing the corresponding portion of the first data and the second data, and writing the second data.

23. The system of claim 22, wherein writing each portion of the first data to a corresponding one of the queues occurs after reserving the spaces in the queues for all portions of the first data.

24. The system of claim 22, wherein determining if the space is available in each queue and if available reserving the spaces includes, for each of multiple of the queues:
  locking the queue;
  determining if the space is available in the queue, after locking the queue;
  if available reserving the space; and
  unlocking the queue, after reserving the space.

25. The system of claim 22, wherein each portion of the first data written to a corresponding one of the queues includes a record.

26. The system of claim 25, further including, before writing data other than one of the records to a first of the queues, if a space has been reserved in the first queue, locking the first queue while determining whether additional space is available in the first queue for the other data before writing the other data to the first queue.

27. The system of claim 22, wherein determining if the space is available in each queue for writing a corresponding portion of the first data includes ensuring that enough space in each queue is available for writing a commit record for any outstanding transactions with the queue.

* * * * *